E. CRANDAL.
Horse Hay Rake.
No. 89,029.  Patented April 20, 1869.
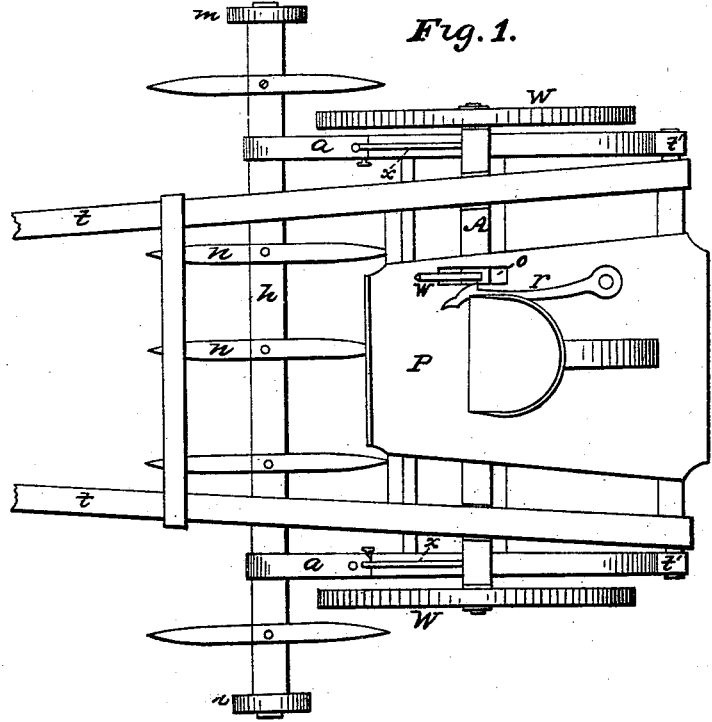
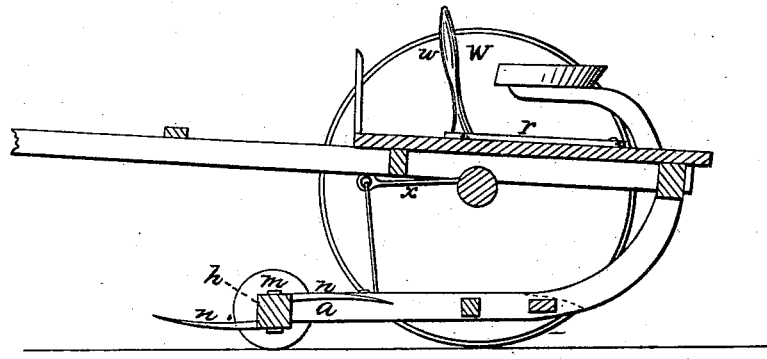
Witnesses:  Inventor:

UNITED STATES PATENT OFFICE.

EDWARD CRANDAL, OF NORTHVILLE, MICHIGAN.

*Letters Patent No. 89,029, dated April 20, 1869.*

IMPROVEMENT IN HORSE-RAKES.

The Schedule referred to in these Letters Patent and making part of the same.

*To all whom it may concern:*

Be it known that I, EDWARD CRANDAL, of Northville, in the county of Wayne, and State of Michigan, have invented a new and useful Improvement in Horse-Rakes; and I do hereby declare that the following is such a full, clear, and exact description thereof, as will enable others skilled in the art to make and use the same, reference being had to the accompanying drawings, which form a part of this specification, in which—

Figure 1 is a plan of my improved rake.

Figure 2 is a longitudinal vertical central section of the same.

Similar letters of reference indicate corresponding parts in the several drawings.

The design of my invention is to produce a simple and effective horse-rake, that shall overcome many of the objections existing heretofore against rakes of the class.

$h$ is a common revolving rake-head, having teeth, $n$ $n$, &c.

Such teeth, $n$, are not made straight, as in other rakes, but are slightly curved, as shown in fig. 2.

$m$ $m$ are two small wheels that support the rake-head, they being only large enough to raise the said head a few inches.

The curve of the teeth $n$ $n$ is such that they will readily pass over the ground.

$t$ $t$ are the thills, $w$, the wheels, and $A$, the axle of a cart or sulky designed to carry the rake.

The rake is attached to a frame, $a$ $a$, as shown in fig. 1.

The frame $a$ $a$ is in turn attached to the frame of the cart by a joint or pivot, at $t'$, so that the frame $a$ and rake may be free to rise or fall when passing over uneven ground.

The thills $t$ $t$ are so attached to the axle $A$, that such axle can be turned without difficulty, and in this case I have employed two straps, or bands of iron, each passing around the axle, and secured to the thills.

Two arms, $x$ $x$, are securely fastened to the axle $A$, so that they turn with such axle.

A rod, or chain, or other suitable article, connects each arm $x$ to the frame $a$ $a$, so that when the arms $x$ are raised, they will raise the frame $a$ and rake.

A lever, $w$, (see fig. 2,) is fastened to the axle, so that by turning such lever the axle will be turned, and the frame $a$ will be elevated, or, by turning in the other direction the frame $a$ will be lowered, as in fig. 2.

An opening, $o$, is made in the platform $p$, (see fig. 1,) through which the lever $w$ passes.

A pawl, $r$, is attached to the same platform $p$, so that when the lever $w$ is pushed or drawn back to elevate the rake, such pawl may be swung against the lever $w$, and hold it back, thus holding the frame $a$ and rake up off of the ground, as shown in fig. 3.

The relative position of the front points $n$, of the teeth of the rake, the rake-head $h$, and the hinge, or pivot $t'$, is such that a line, drawn from the pivot $t'$ to the front ends of the rake-teeth, will pass just above the rake-head, so that there is no tendency on the part of the rake to revolve while the wheels $m$ remain on the ground, as shown in fig. 2.

But when the frame $a$ $a$ is elevated a little, then the centre of the wheels $m$ will be above the line drawn from $t'$ to the front teeth $n$, and, consequently, the rake will revolve as the carriage is drawn along.

By this arrangement, no mechanism is required for the specific purpose of preventing the rake from revolving.

The operation of my rake is as follows:

The operator sits upon the seat $s$, and the rake occupies the position seen in fig. 2.

When a sufficient amount of grass or grain is gathered in the rake, he takes hold of the lever $w$ and draws it back.

The hay, on the front teeth of the rake, will hold them down on the ground and as the frame $a$ is raised, by means of the lever $w$, the effect will be to raise the rear, or the back teeth of the rake, and the rake will revolve, as shown in fig. 4.

As soon as the one-half revolution is made, the rake again assumes the position shown in fig. 2, which it continues to occupy until the frame $a$ $a$ shall be again raised by the operator, by means of the lever $w$, as explained.

The small wheels $w$ keep the rake-head off of the ground, and hence, prevent much of the shelling of seed, in case the grass or grain is ripe.

Having thus described my invention,

What I claim as new, and desire to secure by Letters Patent, is—

The hay-rake described, having the main frame, to which are attached the rake-frame $a$, as described, head $h$, rods $x$, and lever $w$, the whole being arranged and operated as described.

EDWARD CRANDAL.

Witnesses:
ISAAC W. LAMB,
T. E. JOHNS.